United States Patent Office 2,813,131
Patented Nov. 12, 1957

2,813,131

3-(SUBSTITUTED-PHENYL)-3-BROMO-1,1-DI-CHLORO-2-METHYLPROPENES

Donald G. Kundiger and Huey Pledger, Jr., Manhattan, Kans., assignors to The Dow Chemical Company, Midland, Mich., a corporation of Delaware No Drawing. Application September 3, 1953, Serial No. 378,398

6 Claims. (Cl. 260—651)

This invention is directed to 3-(substituted-phenyl)-3-bromo-1,1-dichloro-2-methylpropenes of the formula

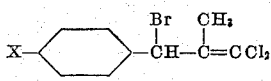

wherein X represents chlorine, bromine or a lower alkyl radical such as methyl, ethyl, isopropyl, tertiary butyl or secondary amyl, and a method for their preparation.

The new compounds are liquids or low-melting solids, substantially insoluble in water and soluble in most organic solvents. They have been found useful as active toxic ingredients of parasiticide compositions and particularly in compositions for the control of spider mites.

The 3-(substituted-phenyl)-3-bromo - 1,1 - dichloro-2-methylpropenes may be prepared by reacting bromine with a 3-(substituted-phenyl)-1,1-dichloro-2-methylpropene of the formula

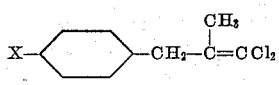

wherein X has the significance previously given. Generally, about equimolar proportions of reactants are employed. The reaction is initiated readily when the reactants are brought together at ordinary temperatures, and proceeds most favorably under the influence of a catalyst such as ultra-violet light.

In carrying out the reaction, the 3-(substituted-phenyl)-1,1-dichloro-2-methylpropene is placed in a reaction vessel and the bromine added thereto portionwise with stirring at room temperature or at somewhat elevated temperature. Hydrogen bromide is evolved as a by-product of reaction, and may be recovered in a water-trap if desired. It is frequently convenient to employ an inert reaction solvent such as carbon tetrachloride. Completion of the reaction is evidenced by the failure of the reaction medium to continue to modify the characteristic red color of additional bromine as added. The desired 3-(substituted-phenyl)-3 - bromo - 1,1 - dichloro-2-methylpropene may be separated from the crude reaction product and purified by such conventional procedures as washing and distillation under reduced pressure.

In a representative operation, 47 grams (0.2 mole) of 3-(para-chlorophenyl)-1,1-dichloro-2-methylpropene was dissolved in 200 milliliters of carbon tetrachloride and 32 grams (0.2 mole) of bromine added thereto dropwise with stirring. The reaction was initiated promptly and proceeded with the evolution of hydrogen bromide. On completion of the bromine addition, the reaction mixture was allowed to stand for 30 minutes. At this time a slight excess of bromine was apparent from its characteristic color. The excess bromine was destroyed by adding portionwise to the reaction mixture a small amount of methyl alcohol. The resulting crude product was fractionally distilled to obtain a 3-(para-chlorophenyl)-3-bromo1,1-dichloro - 2 - methylpropene product boiling at 126°–128° C. at 0.8 to 1.5 millimeters pressure.

In a further operation, 165 grams (0.7 mole) of freshly prepared 3-(para-chlorophenyl)-1,1-dichloro-2-methylpropene was dissolved in 150 milliliters of carbon tetrachloride and 112 grams (0.7 mole) of bromine dissolved in 50 milliliters of carbon tetrachloride added thereto portionwise with stirring over a period of about 2.5 hours. During the above addition, the reaction mixture was irradiated with an ultra-violet lamp. The reaction was initiated promptly as evidenced by the copious evolution of hydrogen bromide. Upon completion of the reaction, the crude reaction product was fractionally distilled to remove the carbon tetrachloride solvent and volatile products of reaction and to obtain as a residue a 3-(para-chlorophenyl)-3-bromo-1,1-dichloro-2-methylpropene product as a light yellow liquid having a refractive index (n/D) of 1.5970 at 20° C. and a density (20°/4° C.) of 1.600.

In similar operations, 3-(para-bromophenyl)-1,1-dichloro-2-methylpropene and 3-(para-tolyl)-1,1-dichloro-2-methylpropene are reacted with equimolar proportions of bromine while exposed to ultra-violet light to produce 3-(para-bromophenyl) - 3 - bromo-1,1-dichloro-2-methylpropene and 3-(para-tolyl)-3-bromo-1,1-dichloro-2-methylpropene, respectively.

Representative 3-(substituted-phenyl)-1,1-dichloro-2-methylpropene starting materials employed in the preparation of the compounds of the present invention are oily liquids characterized by the following physical properties:

| Compound | Boiling Point, ° C. | Pressure in Millimeters |
|---|---|---|
| 3 - (para - chlorophenyl) - 1,1 - dichloro - 2 - methyl propene | 91.3–94 | 0.65 |
| 3 - (para - bromophenyl) - 1,1 - dichloro - 2 - methylpropene | 100–111 | 0.9 |
| 3 - (para-tolyl) - 1,1 - dichloro - 2 - methylpropene | 60–60.3 | 0.1 |

The above and related compounds may be prepared by the method of our copending application Serial No. 294,266, filed June 18, 1952, now abandoned. In such method, one mole of a compound of the formula

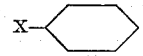

wherein X has the aforementioned significance, is reacted with one mole of 1,1,3-trichloro-2-methyl-1-propene in the presence of a catalytic amount of anhydrous aluminum chloride to produce the desired starting materials having the formula

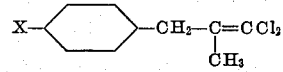

The 3-(halo-phenyl) compounds are claimed as new compounds in our copending application Serial No. 294,265, filed June 18, 1952, now Patent No. 2,745,884.

A composition comprising 3-(para-chlorophenyl)-3-bromo-1,1-dichloro-2-methylpropene together with a surface-active dispersing agent and an inert diluent was dispersed in water to prepare an aqueous spray dispersion containing 0.35 gram of the substituted propene compound per 100 milliliters of spray. This spray dispersion was applied to the foliage of lima bean plants heavily infested with strawberry spider mite (*Tetranychus atlanticus*). Counts made 3 days after the treatment showed that 70 percent of the mites on the treated plants had been killed.

We claim:
1. The 3-(substituted-phenyl)-3-bromo-1,1-dichloro-2-methylpropenes having the formula

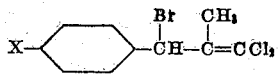

wherein X represents a member of the group consisting of chlorine, bromine and methyl radicals.
2. 3-(para-chlorophenyl)-3-bromo-1,1-dichloro-2-methylpropene.
3. 3-(para-bromophenyl)-3-bromo-1,1-dichloro-2-methylpropene.
4. 3-(para-tolyl)-3-bromo-1,1-dichloro-2-methylpropene.
5. A method for the preparation of 3-(substituted-phenyl)-3-bromo-1,1-dichloro-2-methylpropenes having the formula

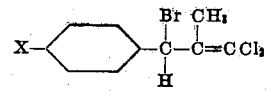

wherein X represents a member of the group consisting of chlorine, bromine and a methyl radical, which comprises the step of reacting bromine with a 3-(substituted-phenyl)-1,1-dichloro-2-methylpropene of the formula

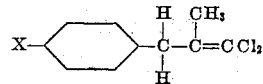

wherein X has the aforesaid significance, in the liquid phase while irradiating the reaction mixture with ultraviolet light.
6. A method according to claim 5 wherein the reaction is carried out at room temperature.

References Cited in the file of this patent
FOREIGN PATENTS
478,084     Germany _____ June 20, 1929
OTHER REFERENCES
Price et al.: "Journal Org. Chem.," volume 8, pages 532 to 535 (1943).